United States Patent Office 3,413,596
Patented Nov. 26, 1968

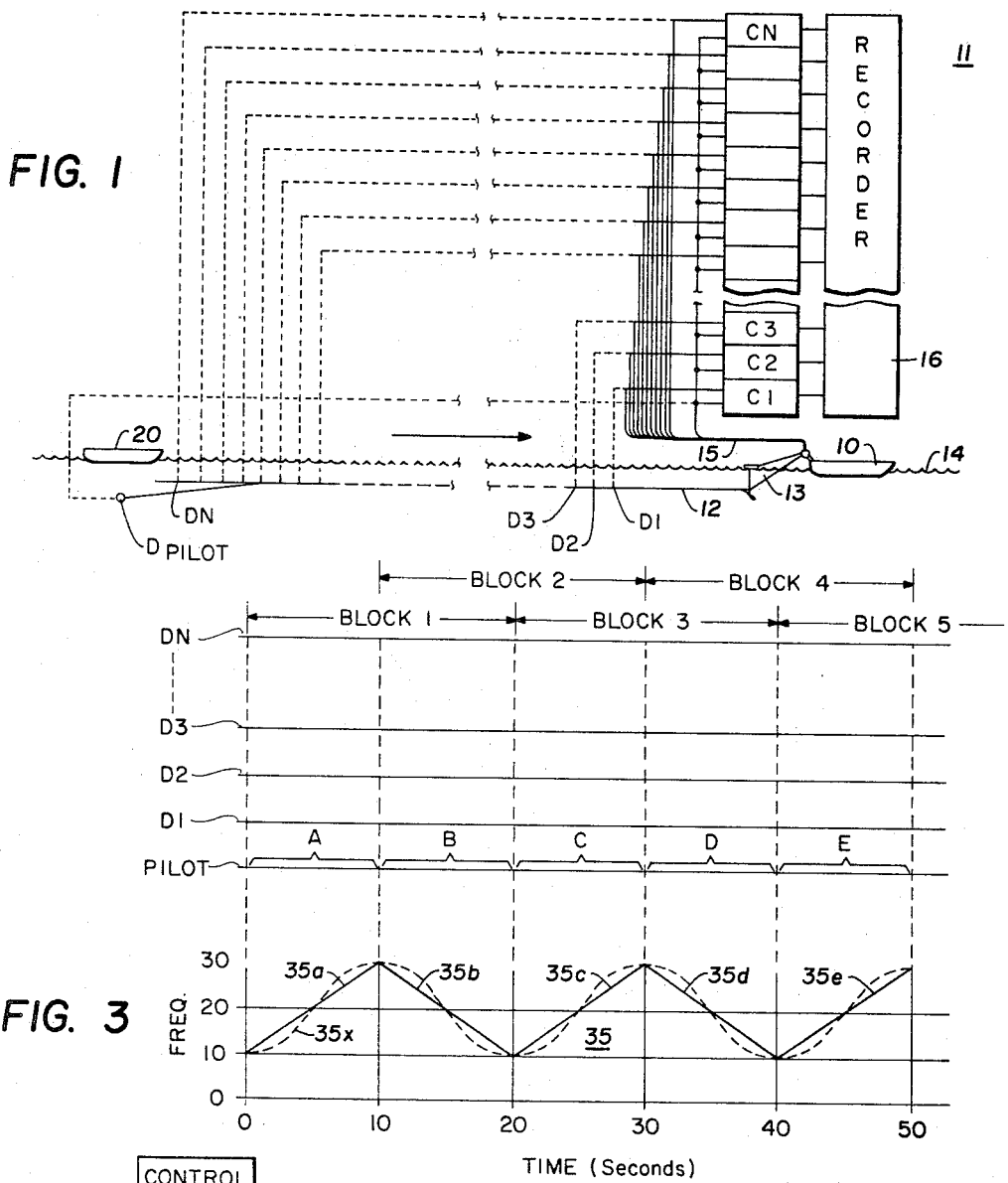

3,413,596
CONTINUOUS WAVE MARINE SEISMIC EXPLORATION
Milo M. Backus and Buford M. Baker, Dallas, Tex., assignors to Texas Instruments Incorporated, Dallas, Tex., a corporation of Delaware
Filed Dec. 8, 1966, Ser. No. 600,101
2 Claims. (Cl. 340—7)

ABSTRACT OF THE DISCLOSURE

Monofrequency seismic energy varies in frequency from one limit to the other in the lower portion of the seismic frequency spectrum while the source thereof moves along a traverse. Cross-correlation between a pilot signal and reflection signals provide spatial averaging of the subsurface refractory horizons.

FIELD OF THE INVENTION

This invention relates to seismic exploration and, more particularly, to a continuous wave seismic source and a correlation method of use thereof.

DESCRIPTION OF THE PRIOR ART

In seismic exploration it has been the practice to create a seismic event by detonating an explosive charge or by creating an impact of a mass on the earth's surface. In further extending techniques for seismic exploration, methods have been developed employing continuous wave generators. In accordance with one mode of operation, a vibrator is operated under suitable control to impart continuous wave vibrations to the earth wherein the frequency of the vibration changes from one end to another of a frequency range in the seismic frequency band. The resultant waves are then detected in a geophone spread. Each output signal thus produced is then cross-correlated with a pilot signal for the production of a seismogram which generally corresponds with records previously obtained through the use of explosive or impact sources.

SUMMARY OF THE INVENTION

The present invention is directed to a system of the latter type particularly adapted for marine operations in order to achieve subsurface averaging. A seismic source boat is provided which is moved along a selected traverse while continuously radiating monofrequency acoustic eenrgy from the boat, which energy is repeatedly cycled over a predetermined frequency range. The energy thus produced is continuously monitored at a point close to the source to produce a pilot signal. The energy is also detected at a plurality of points spaced from the source to produce output signals which include energy reflected from subsurface horizons. The pilot signal and the information signals are then cross-correlated and the resultant signals are employed to provide records representative or indicative of the subsurface reflection interfaces.

A source of variable monofrequency seismic energy is provided which comprises a buoyant vessel adapted to be moved along a marine seismic traverse. A well in the bottom portion of the boat receives a radiating piston. The surface of said piston preferably forms a continuum of the surface of the bottom portion of said boat. Resilient means seal the edges of the piston to the margins of the well. Drive means coupled to the piston applies vibratory energy to the piston to move said piston vertically and thereby imparts energy to the water. Control means varies the frequency of vibration cyclically from maximum to minimum in the low portion of the seismic frequency spectrum.

DESCRIPTION OF THE DRAWINGS

For a more complete understanding of the present invention and for further objects and advantages thereof, reference may now be had to the following description taken in conjunction with the accompanying drawings in which:

FIGURE 1 is a diagram illustrating operation of the present invention;

FIGURE 2 is a sectional view of the source boat of the system of FIGURE 1; and

FIGURE 3 illustrates the nature of the signals employed in the system of FIGURE 1.

DESCRIPTION OF PREFERRED EMBODIMENTS

Referring now to FIGURE 1, a marine seismic exploring system has been shown wherein recording boat 10 is propelled along a course beneath which are formations to be delineated. The recording boat 10 may carry a set of recording and data treating instruments 11. A detector streamer 12 trails behind boat 10. The streamer may be towed from a bridle 13 such that the streamer 12 will be maintained at a uniform depth below the surface 14. The streamer 12 includes a plurality of seismic detectors preferably of the type responsive to pressure variations to produce signals representative of the received seismic waves. Detectors $D_1$, $D_2$, $D_3$ . . . $D_n$ thus form a linear detector array behind boat 10.

The detector signals are applied by way of a cable 15 to inputs of a set of correlators $C_1$, $C_2$, $C_3$ . . . $C_n$. As indicated by the dotted lines, the signal from detector $D_1$ is applied to correlator $C_1$, the signal from detector $D_2$ is applied to one input of correlator $C_2$, etc.

Trailing behind the detector streamer 12 is a pilot detector $D_p$. The pilot signal from the pilot detector $D_p$ is applied to the second input of all of the correlators $C_1$, $C_n$. The outputs from the correlators $C_1$, $C_n$ are then applied to a recorder 16.

A source boat 20 trails the streamer 12 and preferably will be maintained in predetermined relation to the pilot detector $D_p$. The source boat 20 includes a vibration generator shown in FIGURE 2. Boat 20 may be towed by a boat 10 by a cable 21. The boat 20 has a well 22 in the center thereof having a circular periphery formed by the vertical wall 23 and a conical top formed by wall 24 terminating in a short cylinder 25. A radiator piston 26 is mounted in well 22 and is secured to the margins of the well in a water tight manner by a flat resilient ring 27.

A rod 28 coupled to the apex of the conical portion 26a of the piston 26 is coupled to a crank 29 driven by a prime mover 30. The prime mover 30 is mounted on the deck 31. By this means, the piston 26 is reciprocated vertically.

Prime mover 30 is controlled to vary the frequency of the output of the source boat 20 in accordance with a predetermined time function. More particularly as represented by FIGURE 3, the frequency of the sound waves produced by piston 26 is varied over limits and within time intervals which may be as represented by the triangular function 35. In the first 10 seconds of function 35 the frequency varies from 10 c.p.s. to 30 c.p.s. linearly in accordance with segment 35a. It then varies from 30 c.p.s. to 10 c.p.s. in the second 10 second interval as represented by the segment 35b. Segments 35c–35e illustrate the frequency change during succeeding time intervals.

In accordance with the present invention, the signal from the pilot detector $D_p$ is cross-correlated with each of the output signals from each of detectors $D_1$–$D_n$. The correlation employs segment A of the pilot signal 10 seconds long and block 1 20 seconds long, from the signals from each of the detectors $D_1$–$D_n$. Thus the pilot signal during the first half of block 1 is correlated with the signals from detectors $D_1$–$D_n$ of the entire length of block 1. Block 1 overlaps block 2 by half its length. The pilot signal segment B is correlated with the information signals from detectors $D_1$–$D_n$ over the entire length of block 2. Similarly, segments C, D, E . . . N from the pilot signal are employed in correlation operations with succeeding blocks 3, 4 . . . N of the reflection signals.

The object of this operation is to provide adequate signal energy while employing a relatively low energy source. This is accomplished by combining the results of the several correlation operations between a given detector output and the output of the pilot detector $D_p$ to form a single trace or signal which represents the average of the subsurface character over a selected length of the seismic traverse.

By limiting the output of radiation from base 26 to a narrow band, e.g., 10 to 30 c.p.s., and by continuously radiating such power, the total energy requirement is greatly reduced. In operation the recording boat 10 and the source boat 20 will move continuously along a line at a predetermined speed, for example, about six knots. The speed will be selected to achieve the desired signal-to-noise ratio. For this purpose the streamer preferably will include about 24 transducer subarrays designed to eliminate direct energy traveling horizontally along the streamer. When such a system is placed in operation, the result is series of 10 second 24 trace records, each comparable to that which would have been obtained with a filtered explosive record, but wherein the resultant record represents the average over the length of travel of the system during the selected correlation interval. The resultant records may be recorded in the form of seismic record sections to portray substantially continuously the nature of the subsurface formations.

It will be appreciated that the signals from the detectors may be recorded on boat 10 in phonographically reproducible form and that the resultant records may then be reproduced and applied to a processor represented by the system 11 but which is not carried by or employed in connection with the boat 10.

In FIGURE 3 the variations in frequency have been illustrated as being triangular. There is an abrupt transition from linear increase in frequency in interval 35a to an abrupt decrease in interval 35b. Due to the inertia of the system, it is preferably to effect the desired change in a manner other than linearly. For example, the variation represented by the sinusoidal wave form 35x will be preferred. In any event, the source unit of FIGURE 2 is energized continuously to produce a monofrequency output. More particularly, at any instant of time the output has but one principal frequency component. However, the location of the component in the seismic frequency spectrum is continuously varied, preferably in the lower end of this spectrum. Cross-correlations are then performed in the correlation units $C_1$–$C_n$ to produce output signals which may be in the form of multitrace seismograms. The amplitude of each trace on such seismogram is the output of a given correlation unit plotted as a function of $n\tau$ where $\tau$ is the correlation delay interval. The correlation units $C_1$–$C_n$ may be of the type well known in the art, such as described in patent 2,688,124 to Doty et al.; and, for this reason have been indicated in block form only. In order to further show that such apparatus is well known, reference may be had to U.S. Patent 2,676,206 to W. R. Bennett et al. and patent 2,808,577 to Crawford et al.

A particular advantage arises from the present invention by the continuous operation of the source of FIGURE 2 while moving along a traverse. More particularly, a statistical averaging is achieved. As noted above, a ten second, 24 trace seismogram may be obtained which is perfectly analogous to the seismogram that would have been obtained with a filtered explosive record except that, in the present case, the output is averaged over from 100 feet to 200 feet of subsurface as a result of the travel of the system over the 10 second period.

Further, in accordance with the invention, the number of points employed per foot of traverse may be varied as a function of lag time $n\tau$ to produce averaging, as above noted, which varies with depth. More particularly, rather than utilize a 10 second by 10 second correlation throughout the entire 20 second length of a given data block, a modified mode of operation will involve use, for example, of a 10 second by 10 second segment from the pilot wave form and from each of the output traces $D_1$–$D_n$ for delay intervals $n\tau$ between zero to 2 seconds. Thereafter a 20 second by 20 second signal length would be employed for delay intervals $n\tau$ of from 2 seconds to 4 seconds. Thereafter a 30 second by 30 second correlation would be employed for delays $n\tau$ of from 4 seconds to 6 seconds. This sequence of variation in signal lengths may be extended for greater values of $n\tau$. This means that the resulting seismogram would be averaged over a first subsurface segment of length X for the first 2 seconds of record time. The averaging would be over a subsurface segment Y which would be deeper and longer than segment X during the record interval 2 to 4 seconds. Averaging of a still longer subsurface segment Z, deeper and longer than both segments X and Y would characterize the record interval of from 4 to 6 seconds. It will be appreciated that the foregoing limits of the correlation intervals may be carried. However, in accordance with this mode of carrying out the present invention, the operation will be characterized by successively increasing the correlation data length from both the pilot and the received wave forms as the correlation delay $n\tau$ increases.

Having described the invention in connection with certain specific embodiments thereof, it is to be understood that further modifications may now suggest themselves to those skilled in the art and it is intended to cover such modifications as fall within the scope of the appended claims.

What is claimed is:

1. In marine sesmic exploration, the method which comprises:
   (a) moving a seismic source boat along a selected traverse,
   (b) continuously radiating monofrequency acoustic energy from said boat while repeatedly cycling the frequency of such energy over a range from minimum to maximum and back to mimimum in the lower portion of the seismic frequency spectrum during a predetermined time interval,
   (c) continuously monitoring the radiated energy at a point adjacent to said boat to produce a pilot signal,
   (d) continuously receiving the radiated energy at a plurality of detecting locations, which locations move progressively along said traverse in tandem for detection of said energy after reflection from subsurface horizons to produce a plurality of reflection signals,
   (e) cross-correlating time segments of said pilot signal with time segments from each of said reflection signals, and
   (f) varying the lengths of said pilot signal time segments and said reflection signal time segments as a function of the delay intervals $n\tau$ during said cross-correlating step thereby to produce a plurality of related time varying seismic signals representative of travel of energy from said source boat to subsurface reflecting horizons averaged over segments on said horizons of length dependent upon the speed of said boat and said detecting locations and the lengths of said segments.

2. The method according to claim 1 wherein said boat and said detecting stations move along a traverse at about six knots and wherein the lengths of the segments of said pilot signal and reflection signals vary from about 10 seconds to about 30 seconds while the correlation delay interval $n\tau$ varies from zero to 10 seconds thereby to vary the spatial average as a function of the reflection depth.

References Cited

UNITED STATES PATENTS

| | | |
|---|---|---|
| 2,558,089 | 6/1951 | Horsley et al. |
| 2,688,124 | 8/1954 | Doty et al. |
| 2,982,371 | 5/1961 | Woods et al. _____ 181—5 |
| 3,015,086 | 12/1961 | Heintz. |
| 3,022,852 | 2/1962 | Pavey _____ 181—5 |
| 3,209,855 | 10/1965 | Prickett et al. _____ 181—5 |
| 3,229,784 | 1/1966 | Lyons et al. _____ 181—5 |
| 3,234,504 | 2/1966 | Wischmeyer. |
| 3,264,606 | 8/1966 | Crook et al. |

RODNEY D. BENNETT, *Primary Examiner.*

D. C. KAUFMAN, *Assistant Examiner.*